(12) United States Patent
Günther

(10) Patent No.: US 8,321,555 B2
(45) Date of Patent: Nov. 27, 2012

(54) NETWORK ANALYSIS DEVICE

(75) Inventor: Thomas Günther, Langenhagen (DE)

(73) Assignee: ABB AG, Mannheim (DE)

( * ) Notice: Subject to any disclaimer, the term of this patent is extended or adjusted under 35 U.S.C. 154(b) by 784 days.

(21) Appl. No.: 11/798,766

(22) Filed: May 16, 2007

(65) Prior Publication Data

US 2007/0271357 A1    Nov. 22, 2007

(30) Foreign Application Priority Data

May 19, 2006  (DE) .......................... 10 2006 023 715

(51) Int. Cl.
*G05B 15/02* (2006.01)
(52) U.S. Cl. ............................................. 709/224; 700/9
(58) Field of Classification Search .................. 709/224, 709/217
See application file for complete search history.

(56) References Cited

U.S. PATENT DOCUMENTS

| 7,185,083 B2 * | 2/2007 | Christensen et al. | 709/224 |
| 2003/0079070 A1 * | 4/2003 | Cho et al. | 710/101 |
| 2003/0171827 A1 * | 9/2003 | Keyes et al. | 700/19 |
| 2004/0260405 A1 * | 12/2004 | Eddie et al. | 700/3 |
| 2007/0035396 A1 * | 2/2007 | Chand et al. | 340/572.1 |

FOREIGN PATENT DOCUMENTS

| DE | 10 2004 032 966 A1 | 2/2006 |
| WO | WO 03/075206 A2 * | 9/2003 |

* cited by examiner

*Primary Examiner* — Ian N Moore
*Assistant Examiner* — Thai Nguyen
(74) *Attorney, Agent, or Firm* — Buchanan Ingersoll & Rooney PC

(57) ABSTRACT

A network analysis device is disclosed for recording and processing parameters of a communications network for data exchange in a distributed control system of a process engineering system. An exemplary network analysis device has at least one measuring head and a man/machine interface which are physically separate from one another and are logically connected by means of a wireless communications link.

8 Claims, 1 Drawing Sheet

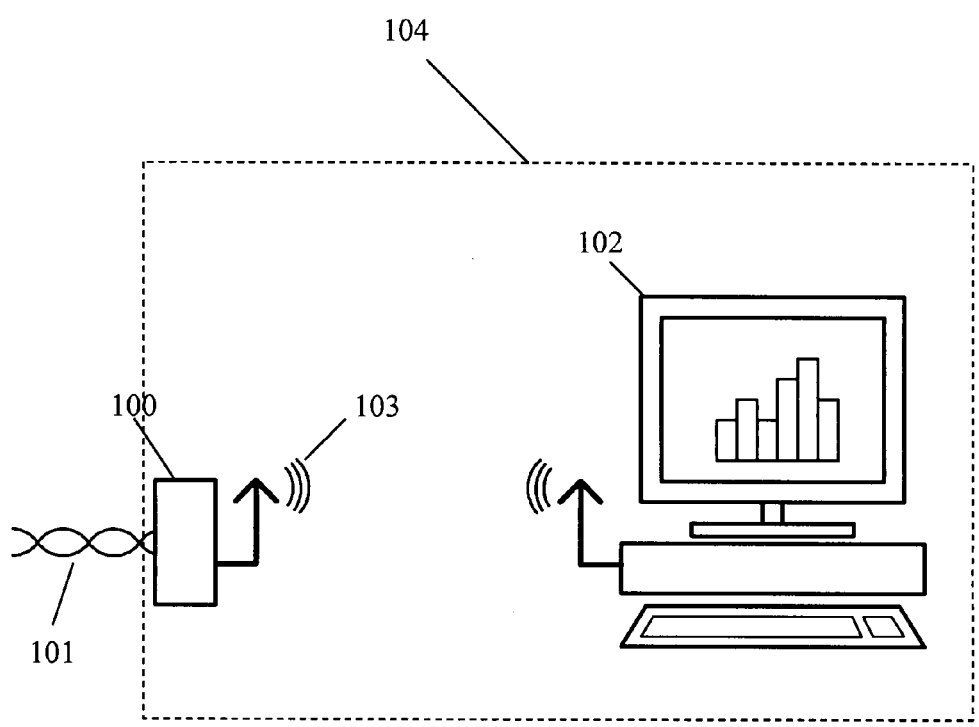

NETWORK ANALYSIS DEVICE

RELATED APPLICATIONS

This application claims priority under 35 U.S.C. §119 to German Application 10 2006 023 715.3 filed in Germany on May 19, 2006, the entire contents of which are hereby incorporated by reference in their entireties.

TECHNICAL FIELD

The disclosure relates to a network analysis device for recording and processing parameters of a communications network for data exchange in a distributed control system of a process engineering system.

BACKGROUND INFORMATION

When field devices are used in automation technology, occasionally problems arise with communications over the digital field buses. The cause of the problems may lie in the actual network technology, such as electrical interference, faulty cabling or defective devices for example. However, complexity is increasingly becoming a problem too. Many devices from different manufacturers must work together. An entirely new category of faults is arising here as a result of incomplete or incorrect protocol implementations, imprecise specifications and unstable device software. In addition, there is an ever higher risk of configuration errors, for example as a result of duplicate address assignments, temporary network overloading or timing problems.

In the meantime very powerful network analysis devices are available for the development of communications devices which enable easy analysis on all communication levels from the physical layer right through to the application. Since these tools must be connected directly to the field bus, they can only be used in a production system to a limited extent. A personal computer is not suitable for installation in the environment of a process engineering system. In particular the use of commercially available personal computers is not possible in areas where there is a risk of explosion in which compliance with special regulations applicable to the operation of electrical equipment is required. In such circumstances, in particular long-term analyses are at least rendered more difficult.

Moreover, a bus tap is required, which cannot be retrofitted without interruption on most field buses.

SUMMARY

A network analysis device is disclosed which is capable of recording and processing the parameters of the communications network irrespective of the type and location of the latter.

For example, a network analysis device is disclosed comprising a plurality of function units linked to one another which are bounded on the process side by a measuring head and on the user side by a man/machine interface, with at least measured-value processing means being provided between the measuring head and the man/machine interface. The measuring head and the man/machine interface can be physically separate from one another and can be logically connected by means of a wireless communications link.

BRIEF DESCRIPTION OF THE DRAWING

A single FIGURE is used to explain an exemplary embodiment. The single FIGURE shows an exemplary network analysis device.

DETAILED DESCRIPTION

An exemplary network analysis device logically structurally comprises a plurality of function units linked to one another which are bounded on the process side by a measuring head and on the user side by a man/machine interface. Arranged between the measuring head and the man/machine interface are at least measured-value processing means to which storage means can be assigned.

The measuring head and the man/machine interface of the network analysis device can be physically separate from one another and can be logically connected by means of a wireless communications link.

It is advantageous if the essential part of the network analysis device in the form of the measuring head is arranged in the unprotected environment in the field area of the process engineering system, whereas all other function units, but at least the man/machine interface, can be accommodated in the control room area.

The physically separate function units of the network analysis device can also be electrically separate from one another so that the special regulations for the operation of electrical equipment in areas with a risk of explosion then only apply to the measuring head.

Inexpensive standard technologies which are known per se can be used for the wireless communications link. These include, but not exclusively, BlueTooth and wireless LAN.

According to another aspect, the measured-value processing means can be physically assigned to the man/machine interface. This combination can be fulfilled by commercially available personal computers.

Advantageously, there is no need for special hardware for the personal computer for connecting to the field bus. As a consequence, any personal computer on which appropriate network analysis software is installed may be used. Consequently, existing hardware on site may be advantageously utilized.

According to another aspect, a plurality of measuring heads can be connected to the same man/machine interface. When measuring heads are installed in different field bus segments, simultaneous analysis of different networks is expediently possible. In addition, it is even possible to analyze networks with different physical buses. This advantage is particularly beneficial in hierarchical networks such as Foundation Fieldbus.

In another exemplary embodiment, the measuring head is supplied with power from the connected field bus. As a consequence it is expediently possible to dispense with separate supply lines in the field area.

According to a further, alternative exemplary embodiment, the measured-value processing means can be at least partly physically assigned to the measuring head. In one exemplary embodiment, preprocessing of the recorded measured values may be provided. In particular this includes, but not exclusively, the filtering and monitoring as well as the collection and consolidation of the recorded measured values. In the case of full measured-value processing in the remote unit equipped with the measuring head, a web browser is advantageously sufficient as the man/machine interface.

In another exemplary embodiment, every field bus segment is already equipped with a measuring head at the time of installation. This enables speedy analysis in the event of a problem without any additional disruption to the process.

According to another aspect, the measuring head can be an integral part of a field device. Advantageously, the field bus data can be accessed without an additional bus connection point.

According to another aspect, the measuring head can be connected to a plurality of man/machine interfaces. This enables a wireless hand-held terminal to be provided as the man/machine interface. In this manner access to the field devices is expediently possible without an additional local bus connection point. This facilitates maintenance or calibration work.

According to another aspect, a plurality of measuring heads can be connected to one another via a wireless communications link. In this case a point-to-point connection exists between two measuring heads in each case. It is consequently expediently possible to bridge relatively large distances between the man/machine interface and a bus segment to be monitored.

The single FIGURE shows an exemplary network analysis device 104 which logically structurally comprises a plurality of function units linked to one another which are bounded on the process side by a measuring head 100 and on the user side by a man/machine interface 102. The measuring head 100 and the man/machine interface 102 of the network analysis device 104 are physically separate from one another and are logically connected by means of a wireless communications link 103. The measuring head 100 is connected to a field bus 101.

Arranged between the measuring head 100 and the man/machine interface 102 can be at least measured-value processing means to which storage means can be assigned.

In one exemplary embodiment, the measured-value processing means can be assigned to the man/machine interface 102 and this combination can be provided by commercially available personal computers.

The measured values recorded with the measuring head 100 from the connected field bus 101 can be sent to the personal computer via the wireless communications link 103. The measured values are collected and processed in the personal computer and the results can be output via the man/machine interface 102.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS

100 Measuring head
101 Field bus
102 Man/machine interface
103 Communications link
104 Network analysis device

What is claimed is:

1. A network analysis system comprising:
a plurality of measuring heads arranged in at least two field buses in a field area of a manufacturing system to record and transmit unprocessed values of the manufacturing system;
a measured-value processing means, electrically and physically separate from the plurality of measuring heads, which is installed outside the field area for receiving the unprocessed values recorded and transmitted by the measuring heads; and
a man/machine interface outside the field area, connected with the measured-value processing means;
wherein the plurality of measuring heads and the man/machine interface are physically separate from one another and are logically connected by a wireless communications link, and wherein at least two of the plurality of measuring heads are connected to each other by a point-to-point connection via the wireless communications link, and
wherein at least one of the plurality of measuring heads is powered by one of the at least two field buses.

2. The network analysis system as claimed in claim 1, wherein the measured-value processing means is physically assigned to the man/machine interface.

3. The network analysis system as claimed in claim 2, wherein the plurality of measuring heads are logically connected by means of a wireless communications link to the same man/machine interface.

4. The network analysis system as claimed in claim 1, wherein at least one of the plurality of measuring heads is logically connected by the wireless communications link to a plurality of man/machine interfaces.

5. The network analysis system as claimed in claim 1, wherein each of the plurality of measuring heads is logically connected by a point-to-point connection via the wireless communications link to another one of the plurality of measuring heads.

6. A network analysis system comprising:
a plurality of function units linked to one another, which are bounded on a process side by a plurality of measuring heads in at least two field buses in a field area of a manufacturing system and on a user side by a man/machine interface, the plurality of measuring heads being electrically connected to the field buses of the process for recording and transmitting unprocessed values of the process;
measured-value processing means provided between the plurality of measuring heads and the man/machine interface, wherein the measured-value processing means processes the unprocessed values recorded and transmitted by the plurality of measuring heads, the measured-value processing means being electrically and physically separate from the plurality of measuring heads; and
a wireless communications link, wherein the plurality of measuring heads and the man/machine interface are connected by the wireless communications link, and wherein at least two of the plurality of measuring heads are connected to each other by a point-to-point connection via the wireless communications link, and
wherein at least one of the plurality of measuring heads is powered by one of the at least two field buses.

7. The network analysis system as claimed in claim 1, wherein the plurality of measuring heads and the man/machine interface are physically and electrically separate from one another.

8. The network analysis system as claimed in claim 6, wherein the plurality of measuring heads and the man/machine interface are electrically separate from one another.

* * * * *